United States Patent
White et al.

(10) Patent No.: US 11,444,520 B1
(45) Date of Patent: Sep. 13, 2022

(54) METHOD FOR MOTOR MANUFACTURING USING A CLIP SYSTEM

(71) Applicant: BETA AIR, LLC, South Burlington, VT (US)

(72) Inventors: Brandon White, South Burlington, VT (US); Stephen Widdis, South Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/529,951

(22) Filed: Nov. 18, 2021

(51) Int. Cl.
  *H02K 15/00* (2006.01)
  *H02K 15/14* (2006.01)
  *H02K 15/03* (2006.01)

(52) U.S. Cl.
  CPC ............. *H02K 15/14* (2013.01); *H02K 15/03* (2013.01); *Y10T 29/49009* (2015.01)

(58) Field of Classification Search
  CPC ...... H02K 15/03; H02K 1/2733; H02K 1/276; H02K 1/28; H02K 2201/09; H02K 7/1025; H01F 1/0578; H01F 1/22; Y10T 29/49012; Y10T 29/49069; Y10T 29/49009
  USPC .............. 29/596, 598, 602.1, 604, 607, 609
  See application file for complete search history.

(56) References Cited

U.S. PATENT DOCUMENTS

| 4,433,261 | A | 2/1984 | Nashiki et al. |
| 5,898,990 | A | 5/1999 | Henry |
| 7,224,096 | B2 * | 5/2007 | Meacham ............... H02K 1/06 310/216.065 |
| 9,479,031 | B2 | 10/2016 | Beste et al. |

FOREIGN PATENT DOCUMENTS

| EP | 3261221 A2 | 12/2017 |
| WO | 2020148223 A1 | 7/2020 |

* cited by examiner

*Primary Examiner* — Thiem D Phan
(74) *Attorney, Agent, or Firm* — Caldwell Intellectual Property Law, LLC

(57) ABSTRACT

A method for motor manufacturing using a clip system is illustrated. The method includes sliding a plurality of magnets onto a vertical dowel hoop, wherein the plurality of magnets are stacked on each dowel, attaching a first plate to the top of the vertical dowel hoop and a second plate to the bottom of the vertical dowel hoop, wherein the plates compress the plurality of magnets on each vertical dowel, and curing the combination of the first plate, the second plate, the plurality of magnets and the vertical dowel hoop.

20 Claims, 4 Drawing Sheets

METHOD FOR MOTOR MANUFACTURING USING A CLIP SYSTEM

FIELD OF THE INVENTION

The present invention generally relates to the field of electric motors. In particular, the present invention is directed to a method for motor manufacturing using a clip system.

BACKGROUND

Occasionally, magnets inside an electric motor may fall over or faulter during flight. Such a small change can lead to catastrophic damages to the aircraft and its workers, so its important to build and cure the motor components effectively.

SUMMARY OF THE DISCLOSURE

In an aspect, a method for motor manufacturing using a clip system is illustrated. The method includes sliding a plurality of magnets onto a vertical dowel hoop, wherein the plurality of magnets are stacked on each dowel, attaching a first plate to the top of the vertical dowel hoop and a second plate to the bottom of the vertical dowel hoop, wherein the plates compress the plurality of magnets on each vertical dowel, and curing the combination of the first plate, the second plate, the plurality of magnets and the vertical dowel hoop.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At a high level, aspects of the present disclosure are directed to an electric aircraft with a motor manufactured using a clip system. In an embodiment, this disclosure includes a vertical dowel hoop with vertical dowel to hold in place stacks of magnets around the circumference of the hoop. Aspects of the present disclosure include sliding a plurality of magnets onto a vertical dowel hoop, wherein the plurality of magnets are stacked on each dowel. Aspects of the present disclosure include attaching a first plate to the top of the vertical dowel hoop and a second plate to the bottom of the vertical dowel hoop, wherein the plates compress the plurality of magnets on each vertical dowel. Aspects of the present disclosure include curing the combination of the first plate, the second plate, the plurality of magnets and the vertical dowel hoop. Exemplary embodiments illustrating aspects of the present disclosure are described below in the context of several specific examples.

Figure 1:
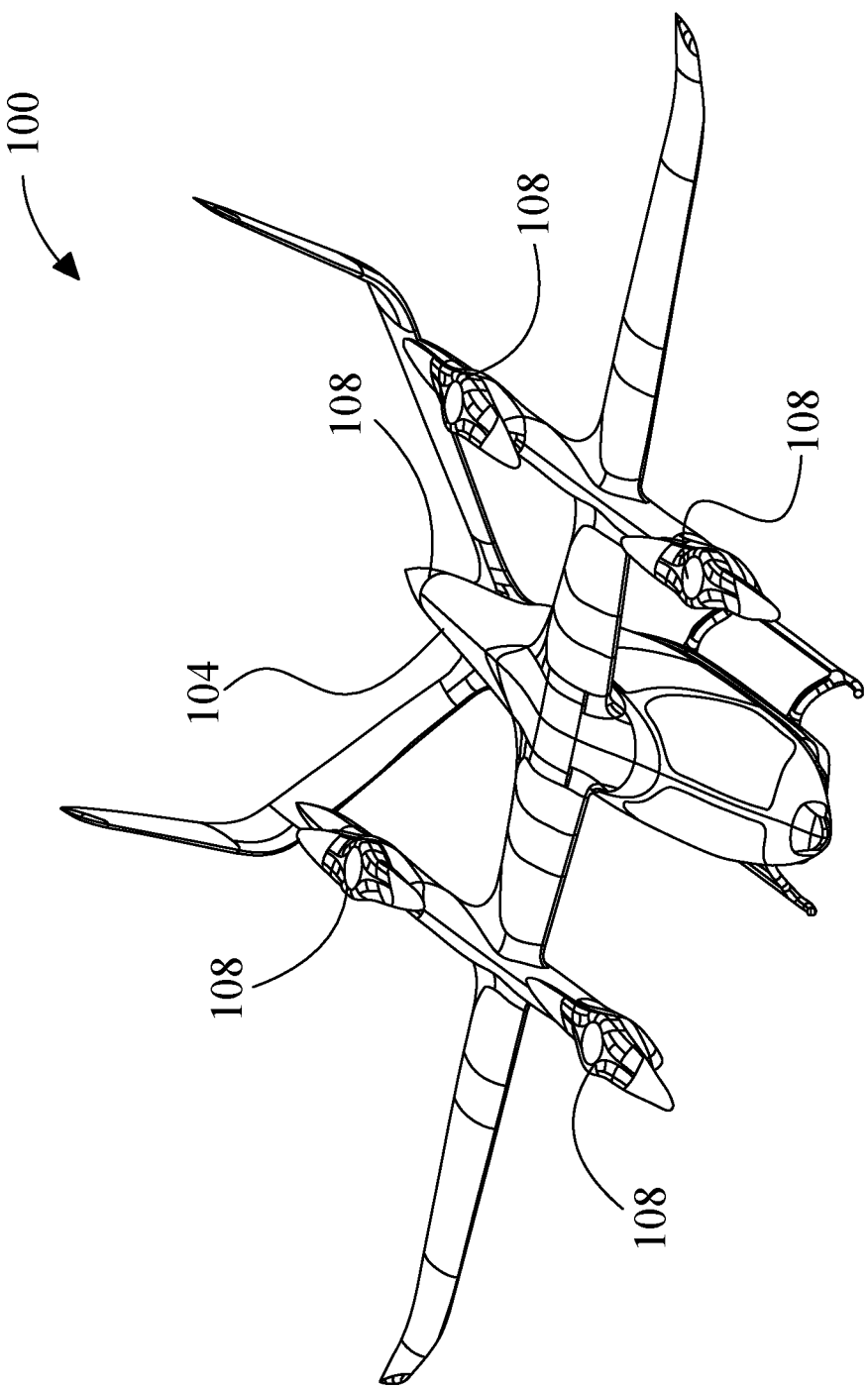
FIG. 1 is a diagrammatic representation of an exemplary embodiment of an electric aircraft.

Referring now to FIG. 1, an exemplary embodiment of an aircraft 100 is illustrated. In an embodiment, aircraft 100 is an electric aircraft. As used in this disclosure an "aircraft" is any vehicle that may fly by gaining support from the air. As a non-limiting example, aircraft may include airplanes, helicopters, commercial and/or recreational aircrafts, instrument flight aircrafts, drones, electric aircrafts, airliners, rotorcrafts, vertical takeoff and landing aircrafts, jets, airships, blimps, gliders, paramotors, and the like. Aircraft 100 may include an electrically powered aircraft. In embodiments, electrically powered aircraft may be an electric vertical takeoff and landing (eVTOL) aircraft. Electric aircraft may be capable of rotor-based cruising flight, rotor-based takeoff, rotor-based landing, fixed-wing cruising flight, airplane-style takeoff, airplane-style landing, and/or any combination thereof. Electric aircraft may include one or more manned and/or unmanned aircrafts. Electric aircraft may include one or more all-electric short takeoff and landing (eSTOL) aircrafts. For example, and without limitation, eSTOL aircrafts may accelerate plane to a flight speed on takeoff and decelerate plane after landing. In an embodiment, and without limitation, electric aircraft may be configured with an electric propulsion assembly. Electric propulsion assembly may include any electric propulsion assembly as described in U.S. Nonprovisional application Ser. No. 16/703,225, filed on Dec. 4, 2019, and entitled "AN INTEGRATED ELECTRIC PROPULSION ASSEMBLY," the entirety of which is incorporated herein by reference.

Still referring to FIG. 1, aircraft 100, may include a fuselage 104 and a flight component 108 (or one or more flight components 108).

As used in this disclosure, a vertical take-off and landing (VTOL) aircraft is an aircraft that can hover, take off, and land vertically. An eVTOL, as used in this disclosure, is an electrically powered aircraft typically using an energy source, of a plurality of energy sources to power aircraft. To optimize the power and energy necessary to propel aircraft 100, eVTOL may be capable of rotor-based cruising flight, rotor-based takeoff, rotor-based landing, fixed-wing cruising flight, airplane-style takeoff, airplane style landing, and/or any combination thereof. Rotor-based flight, as described herein, is where the aircraft generates lift and propulsion by way of one or more powered rotors or blades coupled with an engine, such as a "quad-copter," multi-rotor helicopter, or other vehicle that maintains its lift primarily using downward thrusting propulsors. "Fixed-wing flight", as described herein, is where an aircraft is capable of flight using wings and/or foils that generate lift caused by the aircraft's forward airspeed and the shape of the wings and/or foils, such as airplane-style flight.

Still referring to FIG. 1, as used in this disclosure a "fuselage" is a main body of an aircraft, or in other words, the entirety of the aircraft except for a cockpit, nose, wings, empennage, nacelles, any and all control surfaces, and generally contains an aircraft's payload. Fuselage 104 may include structural elements that physically support a shape and structure of an aircraft. Structural elements may take a plurality of forms, alone or in combination with other types. Structural elements may vary depending on a construction type of aircraft such as without limitation a fuselage 104. Fuselage 104 may comprise a truss structure. A truss structure may be used with a lightweight aircraft and comprises welded steel tube trusses. A "truss," as used in this disclosure, is an assembly of beams that create a rigid structure, often in combinations of triangles to create three-dimensional shapes. A truss structure may alternatively comprise wood construction in place of steel tubes, or a combination thereof. In embodiments, structural elements may comprise steel tubes and/or wood beams. In an embodiment, and without limitation, structural elements may include an aircraft skin. Aircraft skin may be layered over the body shape constructed by trusses. Aircraft skin may comprise a plurality of materials such as plywood sheets, aluminum, fiberglass, and/or carbon fiber, the latter of which will be addressed in greater detail later herein. Fuselage is further described herein with reference to FIG. 2.

In embodiments, and with continued reference to FIG. 1, aircraft fuselage 104 may include and/or be constructed using geodesic construction. Geodesic structural elements may include stringers wound about formers (which may be alternatively called station frames) in opposing spiral directions. A "stringer," as used in this disclosure, is a general structural element that may include a long, thin, and rigid strip of metal or wood that is mechanically coupled to and spans a distance from, station frame to station frame to create an internal skeleton on which to mechanically couple aircraft skin. A former (or station frame) may include a rigid structural element that is disposed along a length of an interior of aircraft fuselage 104 orthogonal to a longitudinal (nose to tail) axis of the aircraft and may form a general shape of fuselage 104. A former may include differing cross-sectional shapes at differing locations along fuselage 104, as the former is a structural element that informs the overall shape of a fuselage 104 curvature. In embodiments, aircraft skin may be anchored to formers and strings such that an outer mold line of a volume encapsulated by formers and stringers comprises the same shape as aircraft 100 when installed. In other words, former(s) may form a fuselage's ribs, and the stringers may form the interstitials between such ribs. A spiral orientation of stringers about formers may provide uniform robustness at any point on an aircraft fuselage such that if a portion sustains damage, another portion may remain largely unaffected. Aircraft skin may be attached to underlying stringers and formers and may interact with a fluid, such as air, to generate lift and perform maneuvers.

In an embodiment, and still referring to FIG. 1, fuselage 104 may include and/or be constructed using monocoque construction. Monocoque construction may include a primary structure that forms a shell (or skin in an aircraft's case) and supports physical loads. Monocoque fuselages are fuselages in which an aircraft skin or shell is also the primary structure. In monocoque construction aircraft skin would support tensile and compressive loads within itself and true monocoque aircraft can be further characterized by the absence of internal structural elements. Aircraft skin in this construction method is rigid and can sustain its shape with no structural assistance form underlying skeleton-like elements. Monocoque fuselage may include aircraft skin made from plywood layered in varying grain directions, epoxy-impregnated fiberglass, carbon fiber, or any combination thereof.

According to embodiments, and further referring to FIG. 1, fuselage 104 may include a semi-monocoque construction. Semi-monocoque construction, as used herein, is a partial monocoque construction, wherein a monocoque construction is describe above detail. In semi-monocoque construction, aircraft fuselage 104 may derive some structural support from stressed aircraft skin and some structural support from underlying frame structure made of structural elements. Formers or station frames can be seen running transverse to the long axis of fuselage 104 with circular cutouts which are generally used in real-world manufacturing for weight savings and for the routing of electrical harnesses and other modern on-board systems. In a semi-monocoque construction, stringers are thin, long strips of material that run parallel to fuselage's long axis. Stringers may be mechanically coupled to formers permanently, such as with rivets. Aircraft skin may be mechanically coupled to stringers and formers permanently, such as by rivets as well. A person of ordinary skill in the art will appreciate, upon reviewing the entirety of this disclosure, that there are numerous methods for mechanical fastening of components like screws, nails, dowels, pins, anchors, adhesives like glue or epoxy, or bolts and nuts, to name a few. A subset of fuselage under the umbrella of semi-monocoque construction includes unibody vehicles. Unibody, which is short for "unitized body" or alternatively "unitary construction", vehicles are characterized by a construction in which the body, floor plan, and chassis form a single structure. In the aircraft world, unibody may be characterized by internal structural elements like formers and stringers being constructed in one piece, integral to the aircraft skin as well as any floor construction like a deck.

Still referring to FIG. 1, stringers and formers, which may account for the bulk of an aircraft structure excluding monocoque construction, may be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin will be transferred to stringers. A location of said stringers greatly informs the type of forces and loads applied to each and every stringer, all of which may be handled by material selection, cross-sectional area, and mechanical coupling methods of each member. A similar assessment may be made for formers. In general, formers may be significantly larger in cross-sectional area and thickness, depending on location, than stringers. Both stringers and formers may comprise aluminum, aluminum alloys, graphite epoxy composite, steel alloys, titanium, or an undisclosed material alone or in combination.

In an embodiment, and still referring to FIG. 1, stressed skin, when used in semi-monocoque construction is a concept where skin of an aircraft bears partial, yet significant, load in an overall structural hierarchy. In other words, an internal structure, whether it be a frame of welded tubes, formers and stringers, or some combination, may not be sufficiently strong enough by design to bear all loads. The concept of stressed skin may be applied in monocoque and semi-monocoque construction methods of fuselage 104. Monocoque comprises only structural skin, and in that sense, aircraft skin undergoes stress by applied aerodynamic fluids imparted by the fluid. Stress as used in continuum mechanics may be described in pound-force per square inch (lbf/in$^2$) or Pascals (Pa). In semi-monocoque construction stressed skin may bear part of aerodynamic loads and additionally may impart force on an underlying structure of stringers and formers.

Still referring to FIG. 1, it should be noted that an illustrative embodiment is presented only, and this disclosure in no way limits the form or construction method of a system and method for loading payload into an eVTOL aircraft. In embodiments, fuselage 104 may be configurable based on needs of an eVTOL per specific mission or objective. A general arrangement of components, structural elements, and hardware associated with storing and/or moving a payload may be added or removed from fuselage 104 as needed, whether it is stowed manually, automatedly, or removed by personnel altogether. Fuselage 104 may be configurable for a plurality of storage options. Bulkheads and dividers may be installed and uninstalled as needed, as well as longitudinal dividers where necessary. Bulkheads and dividers may be installed using integrated slots and hooks, tabs, boss and channel, or hardware like bolts, nuts, screws, nails, clips, pins, and/or dowels, to name a few. Fuselage 104 may also be configurable to accept certain specific cargo containers, or a receptable that can, in turn, accept certain cargo containers.

Still referring to FIG. 1, aircraft 100 may include a plurality of laterally extending elements attached to fuselage 104. As used in this disclosure a "laterally extending element" is an element that projects essentially horizontally from fuselage, including an outrigger, a spar, and/or a fixed wing that extends from fuselage. Wings may be structures which may include airfoils configured to create a pressure differential resulting in lift. Wings may generally dispose on the left and right sides of the aircraft symmetrically, at a point between nose and empennage. Wings may comprise a plurality of geometries in planform view, swept swing, tapered, variable wing, triangular, oblong, elliptical, square, among others. A wing's cross section geometry may comprise an airfoil. An "airfoil" as used in this disclosure is a shape specifically designed such that a fluid flowing above and below it exert differing levels of pressure against the top and bottom surface. In embodiments, the bottom surface of an aircraft can be configured to generate a greater pressure than does the top, resulting in lift. Laterally extending element may comprise differing and/or similar cross-sectional geometries over its cord length or the length from wing tip to where wing meets aircraft's body. One or more wings may be symmetrical about aircraft's longitudinal plane, which comprises the longitudinal or roll axis reaching down the center of aircraft through the nose and empennage, and plane's yaw axis. Laterally extending element may comprise controls surfaces configured to be commanded by a pilot or pilots to change a wing's geometry and therefore its interaction with a fluid medium, like air. Control surfaces may comprise flaps, ailerons, tabs, spoilers, and slats, among others. Control surfaces may dispose on the wings in a plurality of locations and arrangements and in embodiments may be disposed at the leading and trailing edges of the wings, and may be configured to deflect up, down, forward, aft, or a combination thereof. An aircraft, including a dual-mode aircraft may comprise a combination of control surfaces to perform maneuvers while flying or on ground.

Still referring to FIG. 1, aircraft 100 may include a plurality of flight components 108. As used in this disclosure a "flight component" is a component that promotes flight and guidance of an aircraft. In an embodiment, flight component 108 may be mechanically coupled to an aircraft. As used herein, a person of ordinary skill in the art would understand "mechanically coupled" to mean that at least a portion of a device, component, or circuit is connected to at least a portion of the aircraft via a mechanical coupling. Said mechanical coupling may include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. In an embodiment, mechanical coupling may be used to connect ends of adjacent parts and/or objects of an electric aircraft. Further, in an embodiment, mechanical coupling may be used to join two pieces of rotating electric aircraft components.

Still referring to FIG. 1, plurality of flight components 108 may include at least a lift propulsor. As used in this disclosure a "propulsor" is a component and/or device used to propel a craft upward by exerting force on a fluid medium, which may include a gaseous medium such as air or a liquid medium such as water. Propulsor may include any device or component that consumes electrical power on demand to propel an electric aircraft in a direction or other vehicle while on ground or in-flight. For example, and without limitation, propulsor may include a rotor, propeller, paddle wheel and the like thereof. In an embodiment, propulsor may include a plurality of blades. As used in this disclosure a "blade" is a propeller that converts rotary motion from an engine or other power source into a swirling slipstream. In an embodiment, blade may convert rotary motion to push the propeller forwards or backwards. In an embodiment propulsor may include a rotating power-driven hub, to which are attached several radial airfoil-section blades such that the whole assembly rotates about a longitudinal axis. A lift propulsor is further described herein with reference to FIG. 2.

In an embodiment, and still referring to FIG. 1, plurality of flight components 108 may include one or more power sources. As used in this disclosure a "power source" is a source that drives and/or controls any other flight component. For example, and without limitation power source may include a motor that operates to move one or more lift propulsor components, to drive one or more blades, or the like thereof. A motor may be driven by direct current (DC) electric power and may include, without limitation, brushless DC electric motors, switched reluctance motors, induction motors, or any combination thereof. A motor may also include electronic speed controllers or other components for regulating motor speed, rotation direction, and/or dynamic braking. In an embodiment, power source may include an inverter. As used in this disclosure an "inverter" is a device that changes one or more currents of a system. For example, and without limitation, inverter may include one or more electronic devices that change direct current to alternating current. As a further non-limiting example, inverter may include receiving a first input voltage and outputting a second voltage, wherein the second voltage is different from the first voltage. In an embodiment, and without limitation, inverter may output a waveform, wherein a waveform may include a square wave, sine wave, modified sine wave, near sine wave, and the like thereof.

Still referring to FIG. 1, power source may include an energy source. An energy source may include, for example, a generator, a photovoltaic device, a fuel cell such as a hydrogen fuel cell, direct methanol fuel cell, and/or solid oxide fuel cell, an electric energy storage device (e.g. a capacitor, an inductor, and/or a battery). An energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft in which aircraft 100 may be incorporated.

In an embodiment, and still referring to FIG. 1, an energy source may be used to provide a steady supply of electrical power to a load over the course of a flight by a vehicle or other electric aircraft. For example, the energy source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff. In an embodiment, the energy source may be capable of providing sufficient electrical power for auxiliary loads including without limitation, lighting, navigation, communications, de-icing, steering or other systems requiring power or energy. Further, the energy source may be capable of providing sufficient power for controlled descent and landing protocols, including, without limitation, hovering descent or runway landing. As used herein the energy source may have high power density where the electrical power an energy source can usefully produce per unit of volume and/or mass is relatively high. The electrical power is defined as the rate of electrical energy per unit time. An energy source may include a device for which power that may be produced per unit of volume and/or mass has been optimized, at the expense of the maximal total specific energy density or power capacity, during design. Non-limiting examples of items that may be used as at least an energy source may include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

Still referring to FIG. 1, an energy source may include a plurality of energy sources, referred to herein as a module of energy sources. The module may include batteries connected in parallel or in series or a plurality of modules connected either in series or in parallel designed to deliver both the power and energy requirements of the application. Connecting batteries in series may increase the voltage of at least an energy source which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of at least an energy source may be based on the individual battery cell performance or an extrapolation based on the measurement of at least an electrical parameter. In an embodiment where the energy source includes a plurality of battery cells, the overall power output capacity may be dependent on the electrical parameters of each individual cell. If one cell experiences high self-discharge during demand, power drawn from at least an energy source may be decreased to avoid damage to the weakest cell. The energy source may further include, without limitation, wiring, conduit, housing, cooling system and battery management system. Persons skilled in the art will be aware, after reviewing the entirety of this disclosure, of many different components of an energy source.

Still referring to FIG. 1, plurality of flight components 108 may include a pusher component. As used in this disclosure a "pusher component" is a component that pushes and/or thrusts an aircraft through a medium. As a non-limiting example, pusher component may include a pusher propeller, a paddle wheel, a pusher motor, a pusher propulsor, and the like. Additionally, or alternatively, pusher flight component may include a plurality of pusher flight components. Pusher component may be configured to produce a forward thrust. As used in this disclosure a "forward thrust" is a thrust that forces aircraft through a medium in a horizontal direction, wherein a horizontal direction is a direction parallel to the longitudinal axis. For example, forward thrust may include a force of 1145 N to force aircraft to in a horizontal direction along the longitudinal axis. As a further non-limiting example, pusher component may twist and/or rotate to pull air behind it and, at the same time, push aircraft 100 forward with an equal amount of force. In an embodiment, and without limitation, the more air forced behind aircraft, the greater the thrust force with which aircraft 100 is pushed horizontally will be. In another embodiment, and without limitation, forward thrust may force aircraft 100 through the medium of relative air. Additionally or alternatively, plurality of flight components 108 may include one or more puller components. As used in this disclosure a "puller component" is a component that pulls and/or tows an aircraft through a medium. As a non-limiting example, puller component may include a flight component such as a puller propeller, a puller motor, a tractor propeller, a puller propulsor, and the like. Additionally, or alternatively, puller component may include a plurality of puller flight components.

Still referring to FIG. 1, aircraft 100 may have a flight controller. As used in this disclosure a "flight controller" is a computing device of a plurality of computing devices dedicated to data storage, security, distribution of traffic for load balancing, and flight instruction. Computing device may include and/or communicate with any other computing device as described in this disclosure, including without limitation a microcontroller, microprocessor, digital signal processor (DSP) and/or system on a chip (SoC) as described in this disclosure. Further, computing device may include a single computing device operating independently, or may include two or more computing device operating in concert, in parallel, sequentially or the like; two or more computing devices may be included together in a single computing device or in two or more computing devices. In embodiments, computing device may be installed in an aircraft, may control the aircraft remotely, and/or may include an element installed in the aircraft and a remote element in communication therewith.

Figure 2:
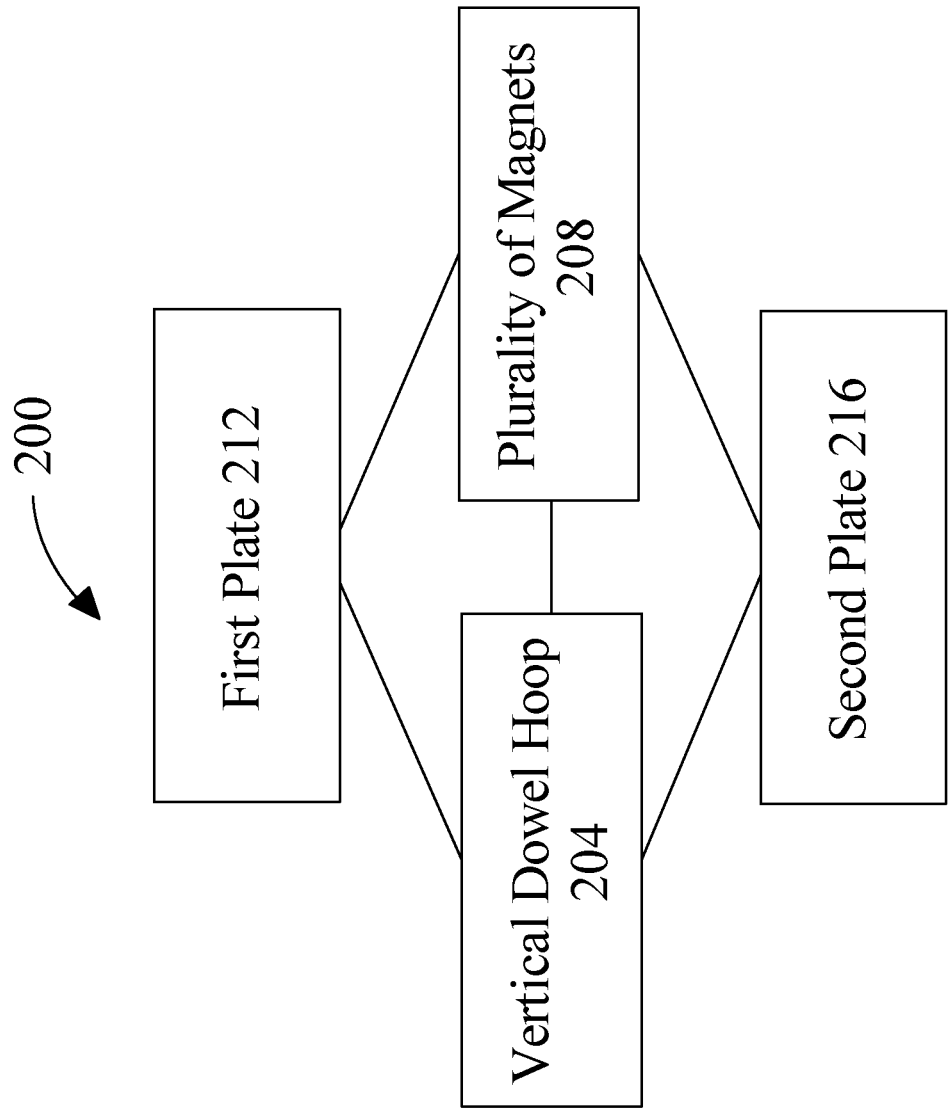
FIG. 2 is a block diagram of an exemplary embodiment of a system for motor manufacturing using a clip system.

Now referring to FIG. 2, a block diagram of an exemplary embodiment of a system for motor manufacturing using a clip system is illustrated. System 200 includes vertical dowel hoop 204, plurality of magnets 208, first plate 212, and second plate 216. In this disclosure, a "motor" is a machine that supplies power to a vehicle. Motor may include without limitation, any electric motor, where an electric motor is a device that converts electrical energy into mechanical energy, for instance by causing a shaft to rotate. Motor may be driven by direct current (DC) electric power; for instance, motor may include a brushed DC motor or the like. Motor may be driven by electric power having varied or reversing voltage levels, such as alternating current (AC) power as produced by an alternating current generator and/or inverter, or otherwise varying power, such as produced by a switching power source. Motor may include, without limitation, brushless DC electric motors, permanent magnet synchronous motors, switched reluctance motors, or induction motors. In addition to inverter and/or switching power source, a circuit driving motor may include electronic speed controllers or other components for regulating motor speed, rotation direction, and/or dynamic braking.

Still referring to FIG. 2, system 200 includes a vertical dowel hoop 204. In this disclosure, "vertical dowel hoop" is a large hoop made from welded metal with vertical dowels attached around the circumference. A "dowel", in this disclosure, is a cylindrical rod commonly used as a structural reinforcement usually attached to some sort of dowel plate; in this instance, the dowels are rigidly attached to the vertical hoop rather than a plate. Vertical dowel hoop 204 may be made from any sort of metal that can be welded such as aluminum, titanium, cooper, nickel, etc. Furthermore, vertical dowel hoop 204 may be made of any material that does not bend easily under heat or pressure, such as titanium, steel, aluminum, and the like. Vertical dowel hoop 204 may be round and welded. Vertical dowels of vertical dowel hoop 204 may be rod-like and rigidly attached to the hoop in order to hold the magnets in place. Dowels on vertical dowel hoop 204 may have the same cross-sectional shape as a hole in each magnet of the plurality of magnets, which are further explained below.

Still referring to FIG. 2, system 200 includes a plurality of magnets 208 on vertical dowel hoop 204. In this disclosure, a "magnet" is a piece of iron or other material that has its atoms ordered so that the material exhibits properties of magnetism, such as attracting other iron-containing objects or aligning itself in an external magnetic field. Plurality of magnets 208 are used in the motor to generate rotation using electrical current. Plurality of magnets 208 use the attraction and repulsion forces caused by their magnetic fields to propel vertical dowel hoop 204 in circular motion. Magnets of plurality of magnets 208 may be electromagnets. In this disclosure, an "electromagnet" is a type of magnet in which the magnetic field is produced by an electric current. Electromagnets usually consist of a wire wrapped into a coil through which a current is concentrated in the hole, denoting the center of the coil. Electromagnets have north and south magnetic poles that are naturally attracted to one another but repel the same pole from another magnet. These repulsion and attraction forces cause magnets to move and turn their electrical energy into kinetic energy. Due to this, the field of the electromagnet flips every half-turn thus causing a continuous circular motion of plurality of magnets 208. Plurality of magnets 208 have a hole through their centers so it can easily slide onto dowels; shape of plurality of magnets 208 match the cross-sectional area shape of vertical dowels so they can easily slide down. Furthermore, more than one magnet may be stacked on each dowel rigidly attached to vertical dowel hoop 204. A layer of glue also may be applied between each magnet of the plurality of magnets stacked on the same dowels; when curing occurs as described below, the glue will harden and hold plurality of magnets 208 together once plates are removed. "Glue" may be any sort of adhesive that hardens during curing.

Still referring to FIG. 2, system 200 includes first plate 212 attached to the top of vertical dowel hoop 204. In this disclosure, a "first plate" is a sheet of metal covering the top of all the magnets on vertical dowel on vertical dowel hoop 204. First plate 212 may be made of any material that does not bend easily under heat or pressure, such as titanium, steel, aluminum, and the like. First plate 212 may be made of any material with a tensile strength of more than 200 MPa. First plate 212 is configured to apply pressure to the top of stack of plurality of magnets 212 while second plate (explained below) applies an upward force from the bottom of the stack, thus compressing plurality of magnets 208. First plate 212 is also configured to be removed from the system once curing is finished.

Still referring to FIG. 2, system 200 includes second plate 216 attached to the bottom of vertical dowel hoop 204. In this disclosure, a "second plate" is a sheet of metal covering the bottom of all the magnets on vertical dowel on vertical dowel hoop 204. Second plate 216 may be made of any material that does not bend easily under heat or pressure, such as titanium, steel, aluminum, and the like. Second plate 216 may be made of any material with a tensile strength of more than 200 MPa. Second plate 216 is configured to apply pressure to the bottom of stack of plurality of magnets 208 while first plate 212 applies a downward force from the top of the stack, thus compressing plurality of magnets 208. Bottom plate 216 is also configured to be removed from the system once curing is finished. First plate 212 and second plate 216 lock together using some sort of connection, locking compressed, stacked magnets inside. Connection may include screws, nails, rivets, dowels, pins, epoxy, glue, welding, crimping, or another undisclosed method alone or in combination as long as it may be removed after curing.

Figure 3:
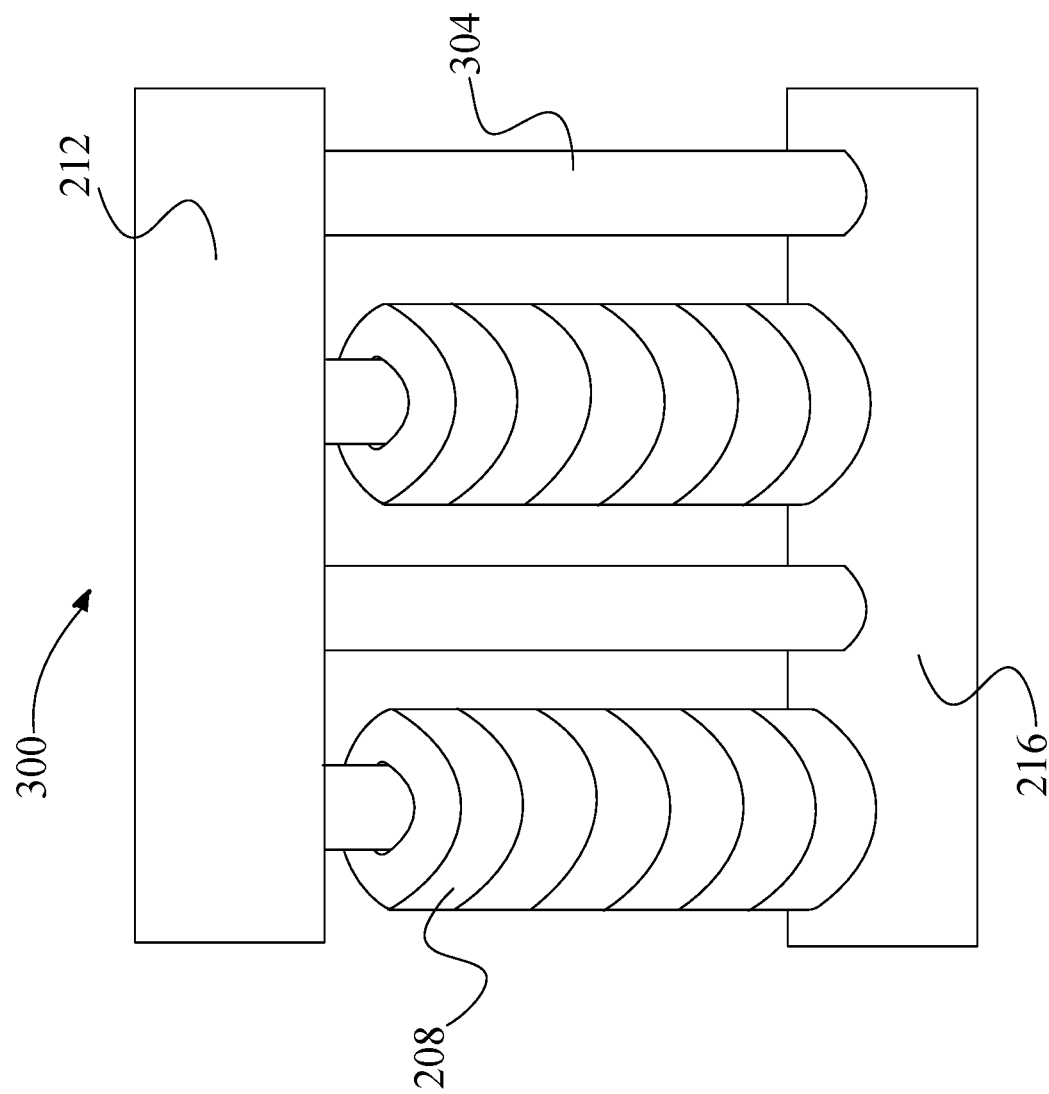
FIG. 3 is an exemplary embodiment of the system for motor manufacturing using a clip system.

Now referring to FIG. 3, an exemplary embodiment of the system for motor manufacturing using a clip system is shown through system 300. System 300 comprises vertical dowel 304 that is attached to vertical dowel hoop 204. Vertical dowel hoop 204 comprises many vertical dowels 304 in order to hold plurality of magnets 208 around the circumference of the hoop. System 300 also comprises first plate 212 and second plate 216 to hold the hoop 204, plurality of magnets 208, and dowel 304 into place while curing.

Figure 4:
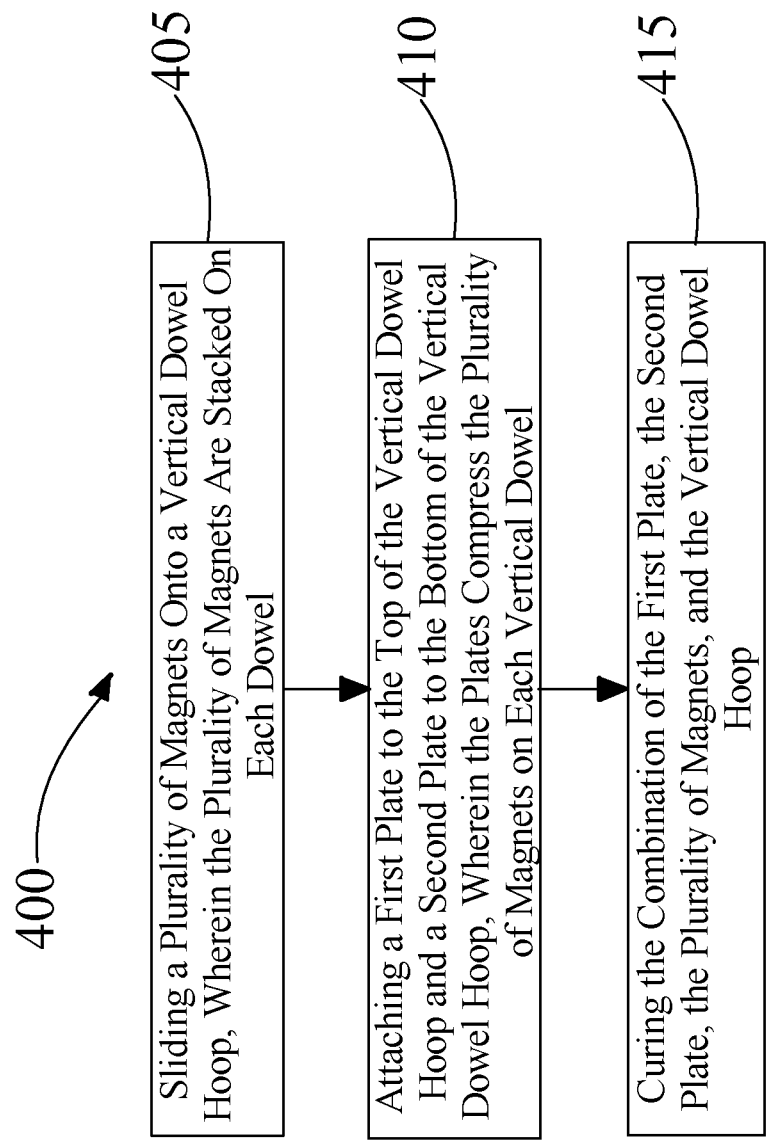
FIG. 4 is a flow diagram of an exemplary embodiment of a method for motor manufacturing using a clip system.

Now referring to FIG. 4, a flow diagram of an exemplary embodiment of a method for motor manufacturing using a clip system of an electric aircraft is illustrated. The electric aircraft may include, but without limitation, any of the aircraft as disclosed herein and described above with reference to at least FIG. 1. Motor being manufactured is used to power to an electric aircraft. Electric aircraft is powered by one or more electric motors. Motor is electrically connected to at least a battery pack in the electric aircraft and includes a motor controller.

Still referring to FIG. 4, at step 405, method 400 includes sliding plurality of magnets 208 onto vertical dowel hoop 204, wherein plurality of magnets 208 are stacked on each dowel. Vertical dowels are rigidly attached to the hoop in order to hold the plurality of magnets in place. Vertical dowels are rigidly attached to the circumference of the hoop. Vertical dowel hoop is welded. Each magnet of the plurality of magnets has a hole through a center of the magnet, the hole shaped to slidably admit a dowel. Two or more magnets of the plurality of magnets can be stacked on each dowel. A layer of glue is applied between adjacent magnets of the plurality of magnets. The layer of glue is an adhesive that becomes rigid during curing. Plurality of magnets 208 may include, but without limitation, any of the magnets as disclosed herein and described above with reference to at least FIG. 2. Vertical dowel hoop 204 may include, but without limitation, any of the hoops as disclosed herein and described above with reference to at least FIG. 2.

Still referring to FIG. 4, at step 410, method 400 includes attaching first plate 212 to the top of vertical dowel hoop 204 and second plate 216 to the bottom of vertical dowel hoop 204. Plurality of magnets are locked into places using the first and second plates. Plates lock together to compress plurality of magnets on each dowel. First plate is placed on top of the stack of the plurality of magnets. Second plate is placed on the bottom of stack of the plurality of magnets. First plate 212 may include, but without limitation, any of the plates as disclosed herein and described above with reference to at least FIG. 2. Second plate 216 may include, but without limitation, any of the plates as disclosed herein and described above with reference to at least FIG. 2. Vertical dowel hoop 204 may include, but without limitation, any of the hoops as disclosed herein and described above with reference to at least FIG. 2.

Still referring to FIG. 4, at step 415, method 400 includes curing the combination of first plate 212, second plate 216, plurality of magnets 208 and vertical dowel hoop 204. Curing comprises heating the combination of the first plate, the second plate, the plurality of magnets and the vertical dowel hoop in an oven. Once cured, the combination of the first plate, the second plate, the plurality of magnets and the vertical dowel hoop are removed from oven. Once cured, the first plate and the second plate are unlocked and removed from the plurality of magnets and vertical dowel hoop, such that the magnets remain in a fixed position on the vertical dowel hoop. Curing occurs at least at 200 degrees Celsius. First plate 212 may include, but without limitation, any of the plates as disclosed herein and described above with reference to at least FIG. 2. Second plate 216 may include, but without limitation, any of the plates as disclosed herein and described above with reference to at least FIG. 2. Plurality of magnets 208 may include, but without limitation, any of the magnets as disclosed herein and described above with reference to at least FIG. 2. Vertical dowel hoop 204 may include, but without limitation, any of the hoops as disclosed herein and described above with reference to at least FIG. 2.

What is claimed:

1. A motor manufacturing method using a clip system for an electric aircraft, the method comprising:
   receiving a vertical dowel hoop, comprising a plurality of vertical dowels about a circumference of the vertical dowel hoop;
   sliding a plurality of magnets onto the vertical dowel hoop, wherein the plurality of magnets are stacked on each dowel of the plurality of dowels;
   attaching a first plate to the top of the vertical dowel hoop and a second plate to the bottom of the vertical dowel hoop, wherein the plates compress the plurality of magnets on each vertical dowel; and
   curing the combination of the first plate, the second plate, the plurality of magnets and the vertical dowel hoop.

2. The method of claim 1, wherein the vertical dowels are rigidly attached to the hoop in order to hold the plurality of magnets in place.

3. The method of claim 1, wherein the vertical dowels are rigidly attached to the circumference of the hoop.

4. The method of claim 1, wherein the vertical dowel hoop is welded.

5. The method of claim 1, wherein each magnet of the plurality of magnets has a hole through a center of the magnet, the hole shaped to slidably admit a dowel.

6. The method of claim 1 further comprising stacking two or more magnets of the plurality of magnets on each dowel.

7. The method of claim 6, wherein the layer of glue is an adhesive that becomes rigid during curing.

8. The method of claim 1 further comprising applying a layer of glue between adjacent magnets of the plurality of magnets.

9. The method of claim 1 further comprising locking the plurality of magnets into place using the first and second plates.

10. The method of claim 1, wherein the plates lock together to compress the plurality of magnets on each dowel.

11. The method of claim 1 further comprising placing the first plate on top of the stack of the plurality of magnets.

12. The method of claim 1 further comprising placing the second plate beneath the stack of the plurality of magnets.

13. The method of claim 1, wherein the first plate and second plate are made out of any material with a tensile strength of more than 200 MPa.

14. The method of claim 13, wherein once cured, the combination of the first plate, the second plate, the plurality of magnets and the vertical dowel hoop are removed from oven.

15. The method of claim 1, wherein curing comprises heating the combination of the first plate, the second plate, the plurality of magnets and the vertical dowel hoop in an oven.

16. The method of claim 1, wherein once cured, the first plate and the second plate are unlocked and removed from the plurality of magnets and vertical dowel hoop, such that the magnets remain in a fixed position on the vertical dowel hoop.

17. The method of claim 1, wherein the motor being manufactured is configured to propel to an electric aircraft.

18. The method of claim 1, wherein the curing occurs at least at 200 degrees Celsius.

19. The method of claim 1, wherein the motor is electrically connected to and electrically powered by at least a battery pack in the electric aircraft.

20. The method of claim 1, wherein the motor includes a motor controller, including an inverter configured to power the motor.

\* \* \* \* \*